United States Patent
Joshi et al.

(10) Patent No.: US 9,075,961 B2
(45) Date of Patent: Jul. 7, 2015

(54) METHOD AND SYSTEM FOR EMBEDDING DATA IN A TEXT DOCUMENT

(71) Applicant: CrimsonLogic Pte Ltd, Singapore (SG)

(72) Inventors: Yash Sunit Joshi, Singapore (SG); Fu Wang Thio, Singapore (SG)

(73) Assignee: CrimsonLogic PTE LTD, Singapore (SG)

( * ) Notice: Subject to any disclaimer, the term of this patent is extended or adjusted under 35 U.S.C. 154(b) by 29 days.

(21) Appl. No.: 14/023,244

(22) Filed: Sep. 10, 2013

(65) Prior Publication Data

US 2015/0074814 A1    Mar. 12, 2015

(51) Int. Cl.
   *G06K 9/34*         (2006.01)
   *G06F 21/10*        (2013.01)

(52) U.S. Cl.
   CPC .................................... *G06F 21/10* (2013.01)

(58) Field of Classification Search
   None
   See application file for complete search history.

(56) References Cited

U.S. PATENT DOCUMENTS

| | | | |
|---|---|---|---|
| 5,592,568 A * | 1/1997 | Wilcox et al. | 382/218 |
| 6,359,985 B1 * | 3/2002 | Koch et al. | 380/54 |
| 7,386,149 B2 * | 6/2008 | Eguchi et al. | 382/100 |
| 2003/0210803 A1 * | 11/2003 | Kaneda et al. | 382/100 |
| 2006/0147084 A1 * | 7/2006 | Hara | 382/100 |
| 2006/0257002 A1 * | 11/2006 | Shi et al. | 382/100 |
| 2007/0014429 A1 * | 1/2007 | He et al. | 382/100 |

OTHER PUBLICATIONS

Chotikakamthorn, N., "Electronic document data hiding technique using inter-character space," Circuits and Systems, 1998. IEEE APC-CAS 1998. The 1998 IEEE Asia-Pacific Conference on , vol., no., pp. 419,422, Nov. 24-27, 1998.*

Chotikakamthorn, Nopporn. "Electronic document data hiding technique using inter-character space." Circuits and Systems, 1998. IEEE APCCAS 1998. The 1998 IEEE Asia-Pacific Conference on. IEEE, 1998.*

* cited by examiner

*Primary Examiner* — Andrae S Allison
(74) *Attorney, Agent, or Firm* — Haynes and Boone, LLP

(57) ABSTRACT

The present invention relates to a method and system of embedding data in text documents. The method includes obtaining a document having dimensions and at least a first character and a second character and determining a length between the first character and the second character to define an inter-character space. A reference length is determined, where the reference length is a function of the dimensions of the text document. A threshold length is determined, where the threshold length is a minimum length wherein information is not encoded in the inter-character space if the inter-character space is not within the threshold length. The information is encoded into an altered inter-character space wherein a length of the altered inter-character space is an integral multiple of the reference length or a non-integral multiple of the reference length.

23 Claims, 8 Drawing Sheets

METHOD AND SYSTEM FOR EMBEDDING DATA IN A TEXT DOCUMENT

FIELD OF THE INVENTION

This invention generally relates to a method and system for embedding data covertly in a text document.

BACKGROUND

Digital watermarking is a well researched area in the signal and image processing community. Watermarks may be visible or invisible, and may conceal or otherwise contain arbitrary data. Many techniques have been devised to hide information covertly in text and image documents. Hiding data is commonly termed "steganography" in the cryptography community.

Existing techniques for steganography typically modify image pixels in an imperceptible manner. Steganography for text documents differs from image steganography, since modifying pixels in a text document can be more apparent visually than modifying pixels in an image. Also, text documents are often printed out and/or photocopied; data hidden using conventional steganography may not be retrievable from a printout or photocopy. Therefore, existing steganography techniques for image documents are not easily applicable to text documents.

Conventional methods for data hiding in text documents include dot encoding, space modulation (line shift coding and word shift coding), luminance modulation, halftone quantization, component manipulations and syntactic methods.

The conventional methods each have their own advantages and disadvantages. For example, dot encoding has high data hiding capacity but is typically vulnerable to photocopying; a photocopied document contains noise which interferes with the decodability of the dots. Further, these dots can also be intentionally disfigured or removed while leaving much of the text intact. On the other hand, syntactic methods are resilient to printing and photocopying but have low data capacity and are not typically self-verifiable.

There is an increasing need to prevent unauthorized disclosure of important information in text documents, especially in this knowledge-based era. The leakage of sensitive information, in both soft copy and paper form, is a widespread security problem. There is a need to discourage improper information disclosure by inserting a track and trace mechanism into a printed text document: traceability is a powerful security measure against document leakage, because it allows the originator of the document to be identified. A covert track and trace mechanism can be implemented effectively through the use of data hiding.

In general, there is a need for a high-capacity document data hiding method that is resilient to printing and scanning and day-to-day document handling, accommodates a wide range of text documents with few or no restrictions, and is self-verifiable.

SUMMARY OF INVENTION

According to an aspect of the invention, there is provided a method of encoding information in text documents. The method includes providing a text document having dimensions and at least a first character and a second character; determining a length between the first character and the second character to define an inter-character space; determining a reference length, the reference length being a function of the dimensions; determining a threshold length, the threshold length being a minimum length wherein information is not encoded in the inter-character space when the inter-character space is less than the threshold length; encoding the information into an altered inter-character space wherein a length of the altered inter-character space is an integral multiple of the reference length or a non-integral multiple of the reference length.

Preferably, the method further includes determining whether the length of the altered inter-character space is within a threshold margin on both sides of the threshold length, wherein the threshold margin is a predetermined length to define an upper threshold margin and a lower threshold margin.

Preferably, the method further includes modifying the length of the altered inter-character space such that the length of the modified altered inter-character space lies outside the lower threshold margin and the upper threshold margin.

Preferably, the information includes a sequence of binary numbers, and the length of the inter-character space is altered to the nearest integral multiple of the reference length when a 0 binary number is encoded.

Preferably, the information includes a sequence of binary numbers, and the length of the inter-character space is altered to a non-integral multiple of the reference length if a 1 binary number is encoded, the altered inter-character space being a length halfway between nearest integral multiples of the reference length.

Preferably, the dimensions include a width of the first character and the second character and the reference length is based on the width of the first character and the second character.

Preferably, the dimensions include a height of the first character and the second character and the reference length is based on the height of the first character and the second character.

Preferably, the dimensions include a height and width of the first character and the second character, and the reference length is a predetermined percentage of a sum including the height and width of the first character and the second character.

Preferably, the dimensions include a height of the text document, and the reference length is a predetermined percentage of the height of the text document.

Preferably, the dimensions include a width of the text document, and the reference length is a predetermined percentage of the width of the text document.

Preferably, the dimensions include a height and width of the text document, and the reference length is a predetermined percentage of the sum of the height and the width of the text document.

Preferably, the reference length is smaller than an average length of all inter-character spaces in the text document.

Preferably, the method further includes decoding the text document to extract the information by: determining a length of inter-character spaces in the text document; determining whether the length of each of the inter-character spaces is greater than the threshold length; determining whether the length of each of the inter-character spaces is an integral multiple of a second reference length or a non-integral multiple of the second reference length where the length of each inter-character spaces is greater than the threshold length; extracting the information including a binary sequence, wherein a 0 binary number is extracted when a length of a respective inter-character space is an integral multiple of the second reference length and a 1 binary number is extracted when the length of the respective inter-character space is a non-integral multiple of the second reference length.

According to an aspect of the invention, there is provided a system for encoding information in text documents. The system includes a data encoding processing device that receives a text document having dimensions and at least a first character and a second character, comprising: a processor for determining a length between the first character and the second character to define an inter-character space, and determining a reference length and a threshold length, the reference length being a function of the dimensions and the threshold length being a minimum length wherein information is not encoded in the inter-character space when the inter-character space is not within the threshold length; wherein the processor encodes information into an altered inter-character space, wherein a length of the altered inter-character space is an integral multiple of the reference length or a non-integral multiple of the reference length.

Preferably, the processor determines whether the length of the altered inter-character space is within a threshold margin on both sides of the threshold length to define a lower threshold margin and an upper threshold margin.

Preferably, the processor alters the length of the altered inter-character space such that the modified altered inter-character space is outside the threshold margin.

Preferably, the information includes a sequence of binary numbers, and the length of the inter-character space is altered to the nearest integral multiple of the reference length when a 0 binary number is encoded.

Preferably, the length of the inter-character space is altered to the non-integral multiple of the reference length when a 1 binary number is encoded, the altered inter-character space being a length halfway between nearest integral multiples a of the reference length.

Preferably, the dimensions include a width of the first character and the second character and the reference length is based on the width of the first character and the second character.

Preferably, the dimensions include a height of the first character and the second character and the reference length is based on the height of the first character and the second character.

Preferably, the dimensions include a height and width of the first character and the second character, and the reference length is a predetermined percentage of a sum including the height and width of the first character and the second character.

Preferably, the dimensions include a height of the text document, and the reference length is a predetermined percentage of the height of the text document.

Preferably, the dimensions include a width of the text document, and the reference length is a predetermined percentage of the width of the text document.

Preferably, the dimensions include a height and width of the text document, and the reference length is a predetermined percentage of the sum of the height and the width of the text document.

Preferably, the reference length is smaller than an average length of all inter-character spaces in the text document.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION

Figure 1:
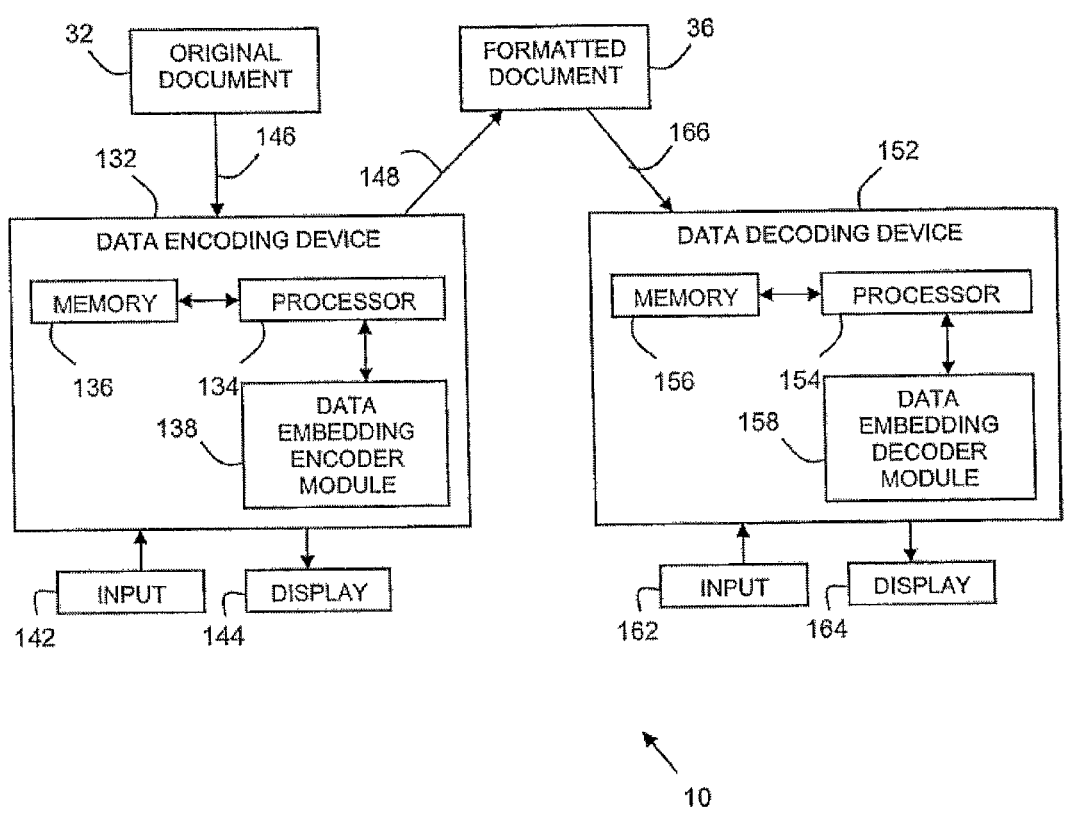
FIG. 1 shows a system in accordance with some embodiments.

FIG. 1 shows a system 10 in accordance with some embodiments for embedding covert data in and extracting the covert data from a text document. An original document 32 is embedded with covert data by a data encoding device 132 which is a computer comprising a processor 134, memory 136, and a data embedding encoder module 138 for encoding the covert data in the text document 32. A user may input and view the data with an input device 152 and a display 154. Once the covert data is encoded and embedded in a formatted document 36, the formatted document 36 is transmitted to a data decoding processing device 152 to decode the embedded covert data in the formatted document 36. The data decoding processing device 152 is a computer comprising a processor 154, memory 156, and data embedding encoder module 158 for decoding the covert data in the formatted document 36. A user may input and view the data with an input device 162 and a display 164.

Although shown as two separate computers, it will be appreciated that the data embedding encoder and decoder modules 138 and 158 may reside on the same computer. A transmission link 146 for transmitting the original document 32 to the data encoding device 132, and transmission links 148 and 166 for transmitting the formatted document 36 from the data encoding device 132 to the data decoding device 152, may include public and/or private networks, local area networks such as Ethernets, wide area networks such as the Internet, and/or the like. The documents 32 and 36 may be hardcopies and/or electronic versions. If the documents 32 and 36 are in hardcopy form, the documents may be converted into electronic format by scanning and/or the like.

Figure 2:
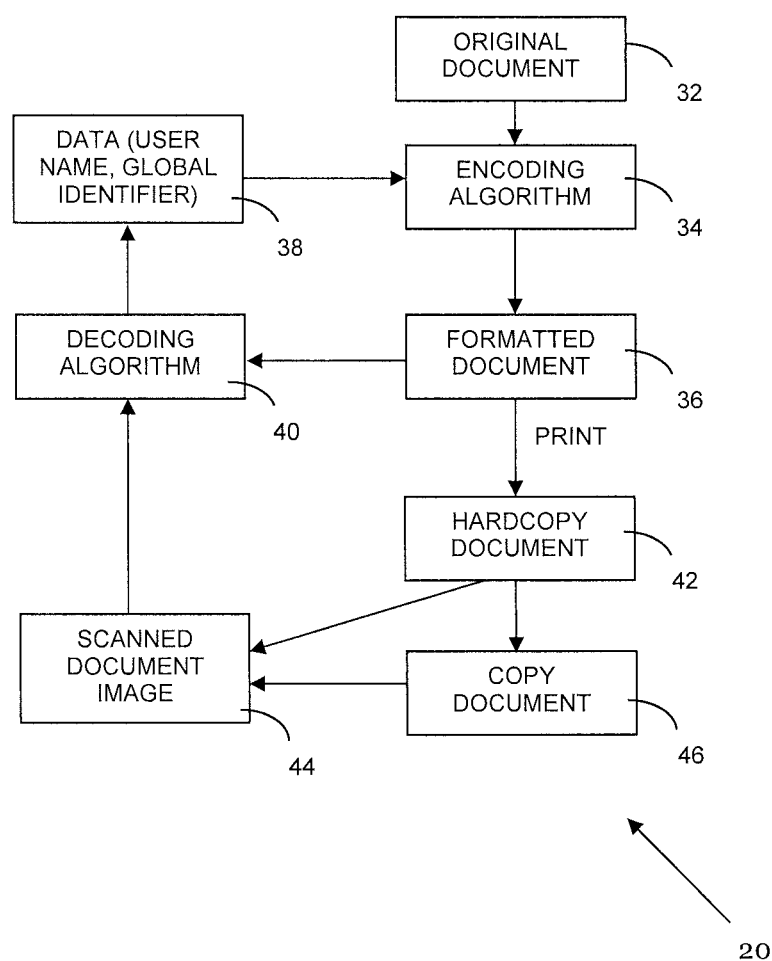
FIG. 2 shows a flow chart of a method of data hiding in a text document and data extracting from the text document that includes encoding and decoding the data in accordance with some embodiments.

FIG. 2 shows a flow chart 20 of a method of data hiding and data extracting in a text document in accordance with some embodiments. The original document 32 is converted by an encoding algorithm 34 into the formatted document 36. The data 38 to be hidden may be a user name, global identifier, and/or the like. A decoding algorithm 48 can extract the hidden data 38 from the formatted document 36. In some examples, the formatted document 36 may be printed to produce a hardcopy document 42, which can be decoded by scanning it to produce a scanned document image 44 and then decoding the scanned image using the decoding algorithm 48. In some examples, the hardcopy document 42 can be further replicated using a photocopier to create a copy document 46, which can also be decoded by scanning it to produce a scanned document image 44 and then decoding the scanned image using the decoding algorithm 48.

It will be appreciated that the document format (representation) of the original document 32 may be any fixed-layout format (such as PDF, PostScript, or an image format such as JPEG), since the encoding algorithm is independent of the document format. The mechanism of altering space lengths does depend on the document format.

It will be appreciated that the method may be applied to documents containing any language as long as there is a "space" that exists between "characters".

For a formatted text document, the term "inter-character space" refers to the horizontal space between horizontally adjacent characters, a right character and a left character, in a text row. For example, the horizontal space between the right-most point of the left character and the left-most point of the adjacent right character. The lengths of inter-character spaces may be determined by the length of the horizontal space between adjacent characters in a text row and can be expressed using but is not limited to pixels.

Figure 3:
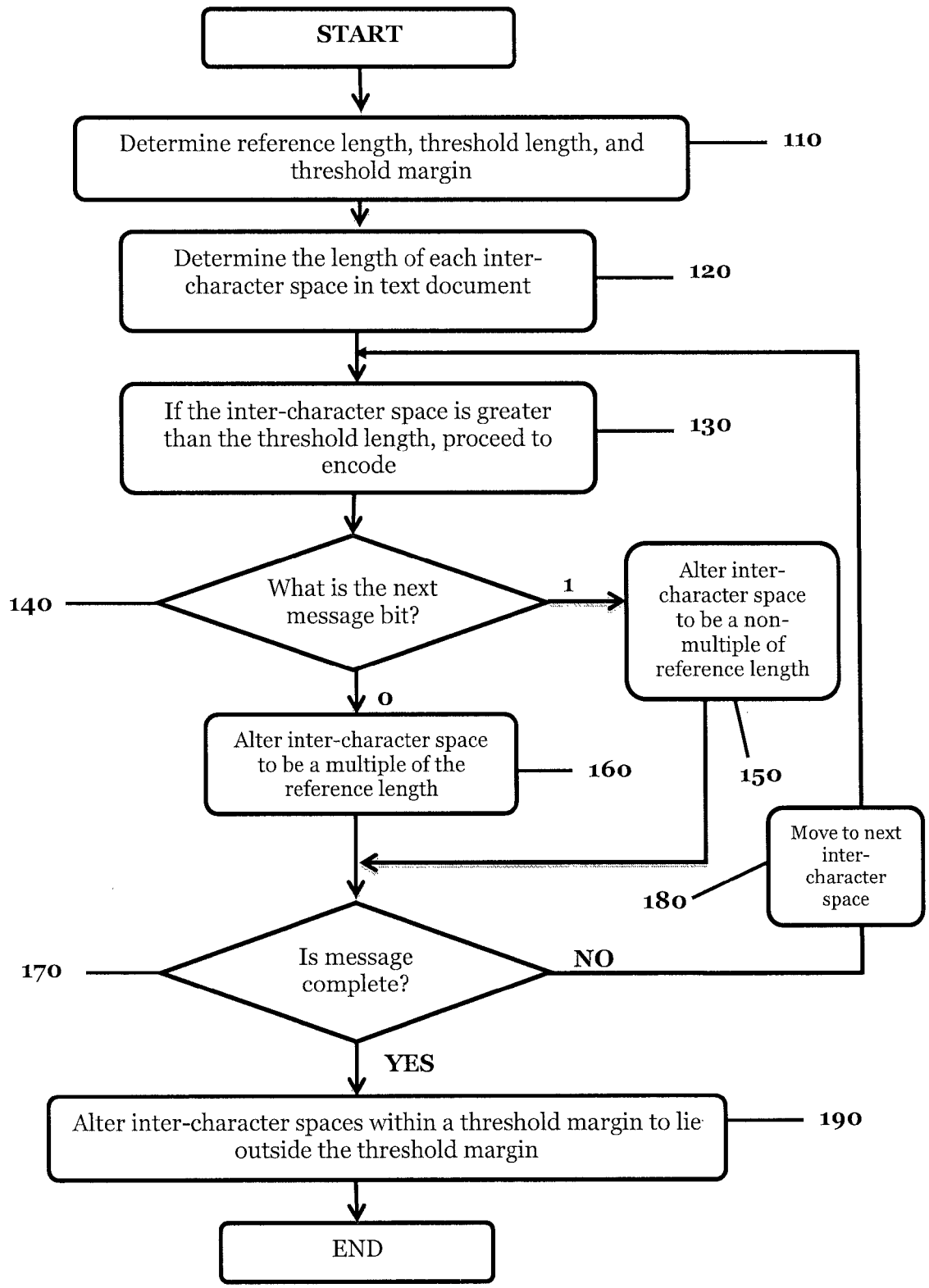
FIG. 3 is a flow chart describing the encoding process in accordance with some embodiments.

FIG. 3 shows a method of embedding information or covert data in a text document according to some embodiments. To encode information into the text document, a reference length, a threshold length, and a threshold margin are first determined at step 110. The reference length and the threshold length are a function of the dimensions of the text document. The dimensions of the text document include all the dimensions associated with the text document and the text contained therein. The threshold margin is a margin of distance above and below the threshold length and can be determined independently or derived from the threshold length. Details of these parameters will be explained hereinafter.

The reference length and the threshold length are a function of the dimensions of the text document. The dimensions of the text document include but are not limited to the height and width of the characters, i.e. the character width and height. The dimensions of the text document may also include the height and width of the text document, i.e. the page height and width. In some examples, the reference length and the threshold length can be the average height or width of the characters in the text document. In some examples, the reference length and threshold length can also be a function of a predetermined percentage of the sum of the average height and width of the characters in the text document. In some examples, the reference length and the threshold length can be computed based on a per line of text basis. In some examples, the reference length and threshold length can be a function of the height and width of the text document. For example, when the height of the text document is obtained, the reference length can be obtained by taking a predetermined percentage of the height of the text document. In some examples, the reference length and threshold length can also be a predetermined percentage of the sum of the height and width of the text document. The reference length and threshold length is preferably smaller than the length of the inter-character space. The use of a reference length and other measurements that are relative to this reference length rather than absolute measurements makes the encoding and decoding process robust to linear scaling of the text document. It is noted that the algorithm works on relative values; consequently, the lengths of the inter-character spaces can be measured in any unit, as long as the same unit is used throughout the document.

The threshold length is the minimum length of an inter-character space for that space to be encodable. An inter-character space smaller than the threshold length would therefore not have any information encoded within the inter-character space. This ensures that relatively small inter-character spaces are not altered because by doing so, such alterations could be perceptible since the adjacent characters may overlap with each other. Although the threshold length can be a function of the dimensions of the text document, the threshold length can also be derived independently or derived as a function of the reference length. For example, the threshold length can be 3 times the reference length.

At step 120, the length of each inter-character space within the text document is determined. Although the step 110 of determining the reference length, the threshold length and the threshold margin is conducted before step 120, it would be understood by a skilled person that steps 110 and 120 are interchangeable and can be conducted one before the other. In addition, each parameter (i.e. the reference length, the threshold length, and/or threshold margin) of step 110 can be determined at various time intervals during the process of encoding and is not limited to the same time interval. When the digital page is encoded in a format such as PDF or PostScript, the lengths may be extracted using a parser. When the digital page is an image rather than a document file, the extraction of these lengths may be done using image processing techniques. As the extraction of the lengths of inter-character spacing in a text document uses known techniques which are known to persons skilled in the art, a detailed explanation of the various techniques would not be required.

The information is encoded or embedded such that the information is integral to the text of the document. This is done by modifying or altering the inter-character spaces in the document in accordance with a modulo function, which results in a sequence of inter-character space lengths that are exact integral multiples or non-integral multiples of the reference length in accordance with the bit stream to be transmitted, details of which will be explained hereinafter.

The information to be embedded or encoded in the text document includes a sequence of binary numbers consisting of 0 or 1. The sequence of binary numbers represents meaningful information to the person encoding the information. The encoding process iterates through each inter-character space and determines whether the length of the inter-character space is greater than the threshold length at step 130. When the length of the inter-character space or the inter-character distance is greater than the threshold length, the next binary number of information is encoded. When the length of the inter-character space is less than the threshold length, the algorithm will simply proceed to the next inter-character space. Depending on the next binary number in the sequence of information, the encoding process alters the length of the inter-character space to an integral multiple of the reference length when a 0 binary number is to be encoded (at step 160), or to a non-integral multiple of the reference length when a 1 binary number is to be transmitted (at step 150). For example, the non-integral multiple of the reference length is at a midpoint between two integral multiples of the reference length when a 1 binary number is transmitted. A reverse encoding is also possible where the length of the inter-character space can be altered to an integral multiple of the reference length when a 1 binary number is to be encoded and to a non-integral multiple of the reference length when a 0 binary number is to be encoded. The process is iterative and determines when the complete sequence of binary numbers has been encoded at step 170. when the complete sequence of binary numbers has not been encoded, the process moves to the next inter-character space at step 180 iterates again.

Once the sequence of binary numbers making up the information has been encoded, the encoding of the information is considered to be completed. The algorithm next iterates through the altered or encoded inter-character spaces to identify any lengths of inter-character spaces within the threshold margin. The threshold margin is a predetermined minimum distance on both sides of the threshold length. For example, if the threshold length is 20 units, a threshold margin of 5 units indicates that the lower threshold margin is from 15-20 units while the upper threshold margin is from 20-25 units. The use of the threshold margin, as will be explained in detail later, is to reduce the error rate particularly when changes have been made to the encoded text document. For example, the encoded text document may have gone through a print-scan cycle.

The relationship between the reference length ($L_r$), the original inter-character space (c), and the altered inter-character space (c') for encoding a 0 binary number and a 1 binary number are provided by the following modulo-based formula:

When a 0 binary number is to be transmitted, the length of the inter-character space is modified to c', which is given by:

$$c' = c - c \bmod L_r \text{ if } (c \bmod L_r) \text{ is less than half of } L_r$$

$$c - c \bmod L_r + L_r \text{ if } (c \bmod L_r) \text{ is greater than half of } L_r \quad \text{Eqn. 1}$$

where c is the length of the inter-character space under consideration and $L_r$ is the reference length.

Likewise, when a 1 binary number is to be transmitted, the length of the inter-character space is altered to:

$$c' = c - c \bmod L_r + 0.5 L_r \quad \text{Eqn. 2}$$

Therefore, when a 1 binary number is encoded, the length of the inter-character space (c) is altered such that the length of the inter-character space is halfway between the nearest integral multiples of the reference length ($L_r$) about the inter-character space (c). When a 0 binary number is encoded, the length of the inter-character space is altered such that the length of the inter-character space is at the nearest exact integral multiple of the reference length ($L_r$).

Figure 4:
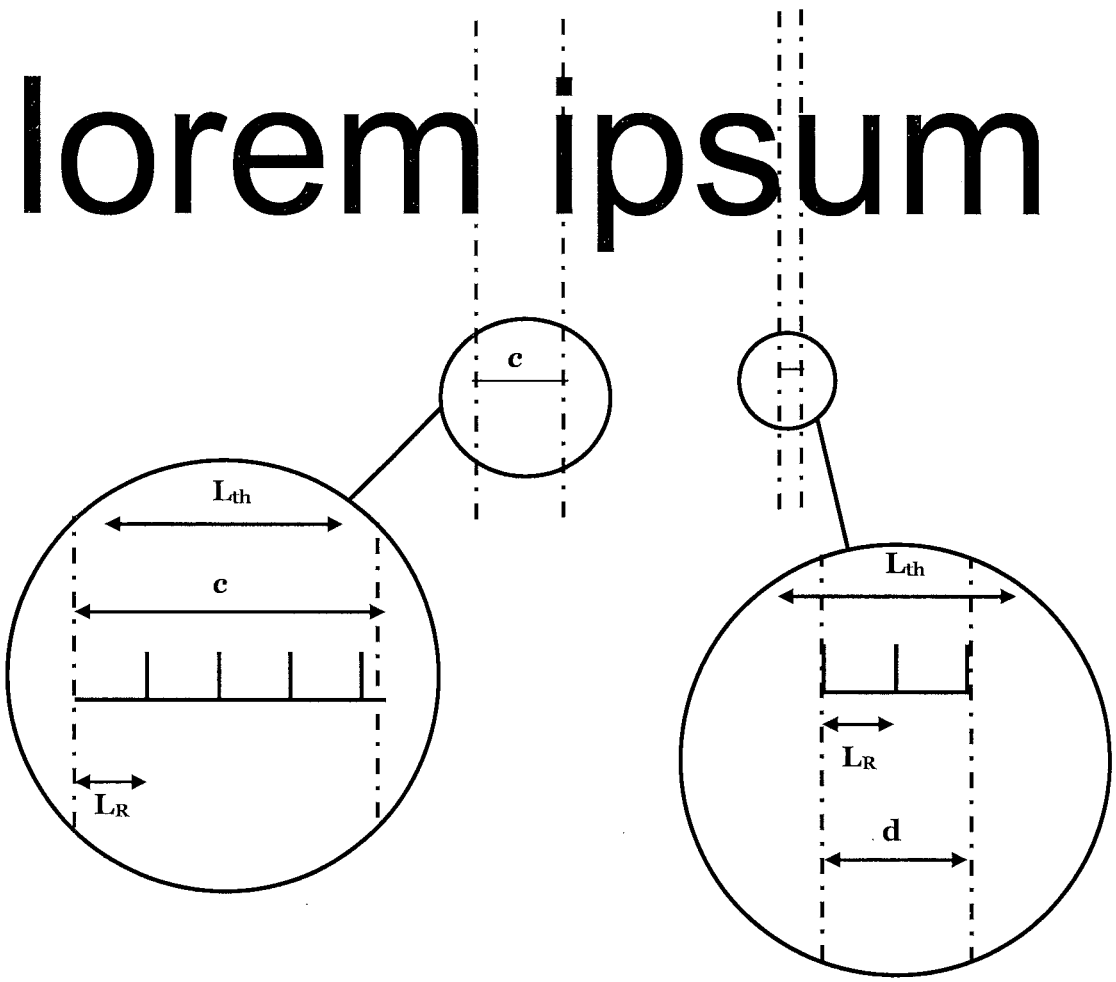
FIG. 4 shows an encodable and a non-encodable inter-character space between a first character and a second character in accordance with some embodiments.
Figure 5:
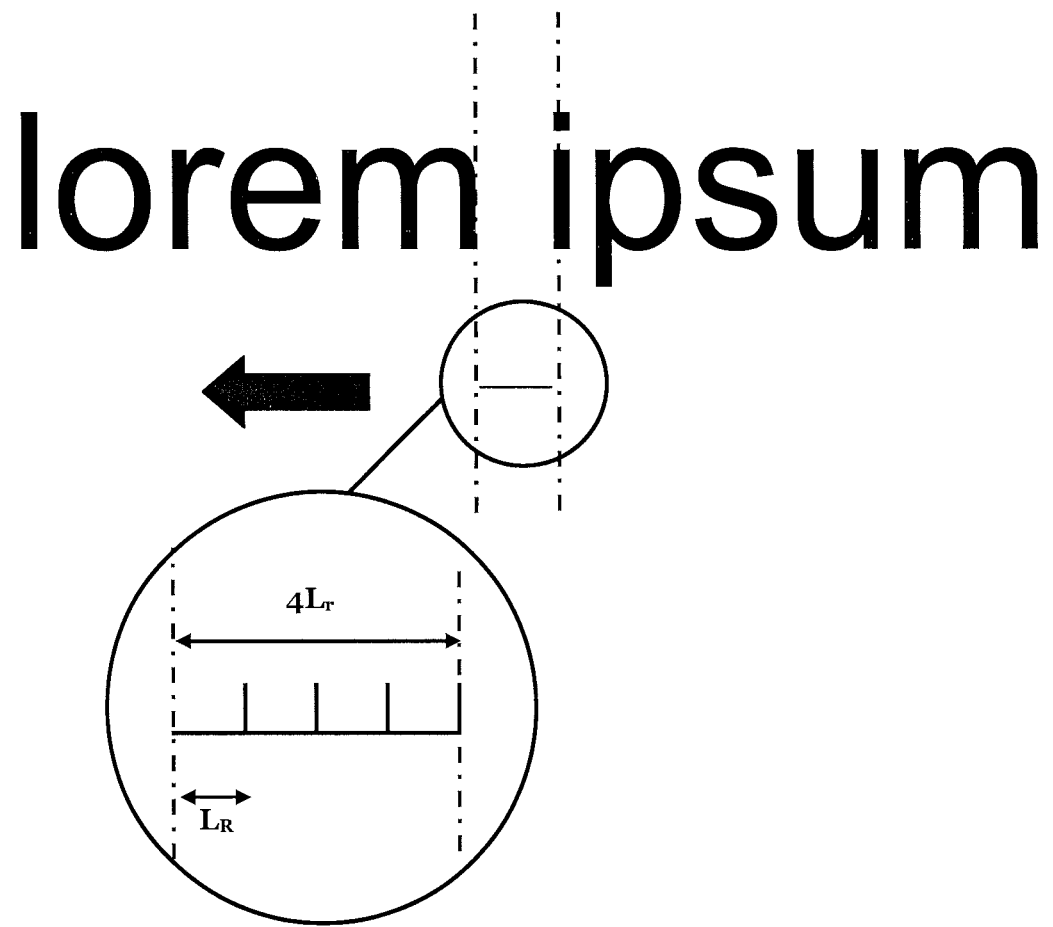
FIG. 5 shows an altered inter-character space such that the altered inter-character space is an integral multiple of the reference length to encode a 0 binary number in accordance with some embodiments.

FIG. 4 shows the lengths of inter-character spaces in a portion of the text document prior to encoding in accordance with some embodiments. FIG. 4 shows a length of inter-character space (c) that is greater than the threshold length ($L_{th}$). In this case, the encoding algorithm will proceed to encode information in the form of binary digit 1 or 0 into the altered inter-character space based on the application of the modulo-based formula provided above. FIG. 4 additional shows another length of inter-character space (d) in which its length is less than the threshold length ($L_{th}$). In this case, the inter-character space will be disregarded and the encoding algorithm will move on to the next inter-character space. FIG. 5 shows the same length of inter-character space (c) as in FIG. 4 which has been altered to encode a 0 in accordance with some embodiments. The length of the inter-character space is altered to the nearest integral multiple of the reference length ($L_r$). In FIG. 5, the length of the inter-character space is altered to be smaller than the original inter-character space (as in FIG. 4) since the nearest integral multiple is determined to be smaller than the length of the original inter-character space (c). This is in accordance with the Equation 1 for the case that (c mod $L_r$) is less than half of $L_r$.

Figure 6:
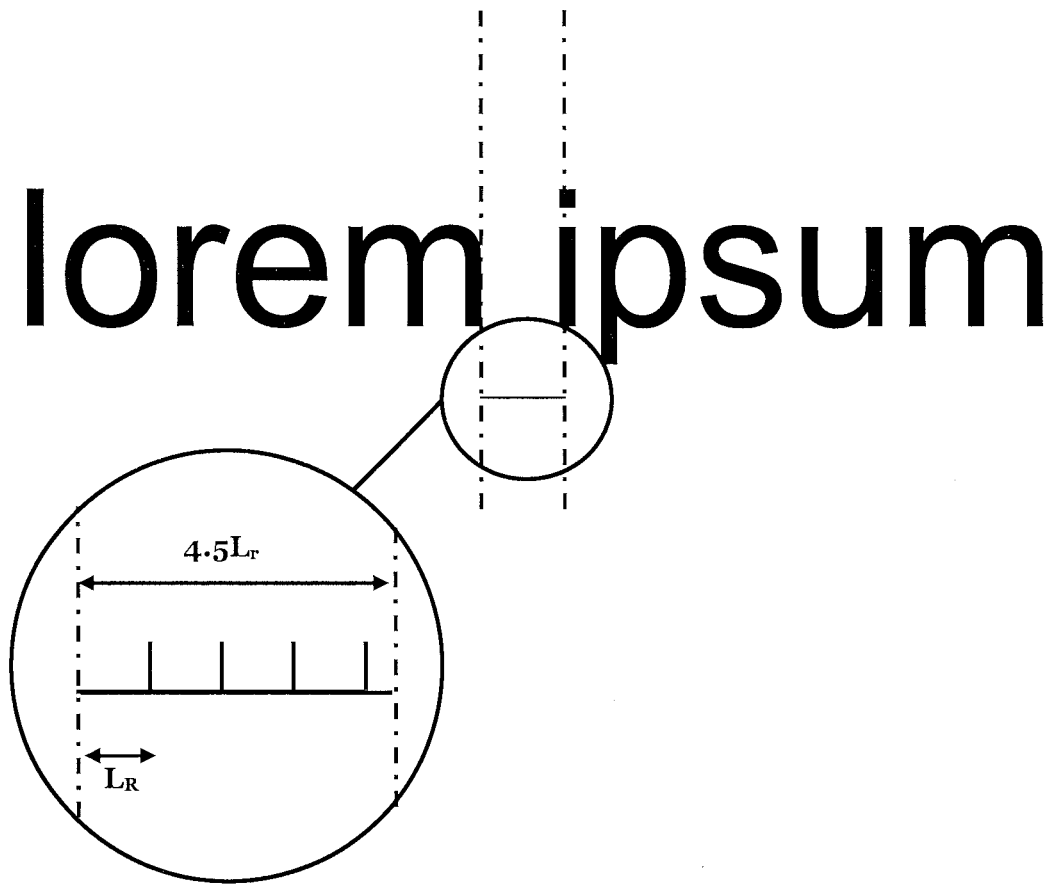
FIG. 6 shows an altered inter-character space such that the altered inter-character space is a length between the integral multiple and the next nearest multiple of the reference length to encode a 1 binary number in accordance with some embodiments.

FIG. 6 shows an encodable length of inter-character space which has been altered to encode a 1 in accordance with some embodiments. The length of the inter-character space is altered to the length halfway between the nearest integral multiples of the reference length ($L_r$), as provided by Equation 2.

Figure 7:
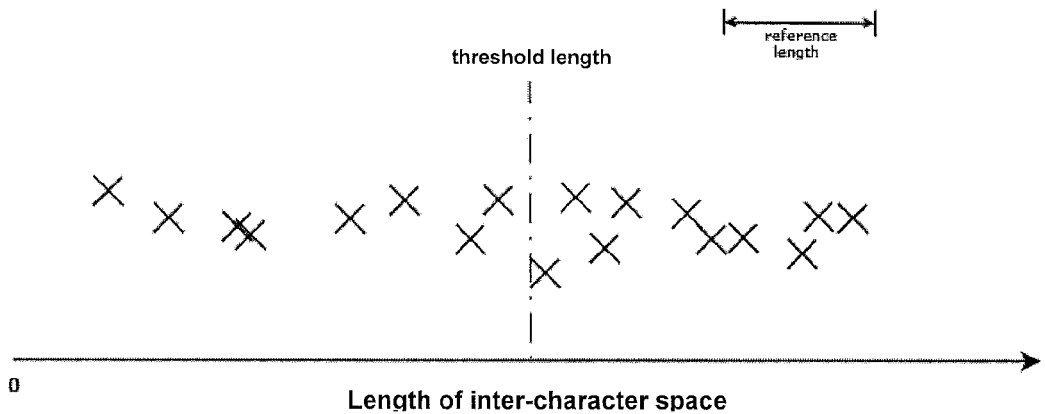
FIG. 7 shows the length of inter-character spaces extracted from a portion of text in a text document in accordance with some embodiments.

FIG. 7 shows the lengths of inter-character spaces extracted from a portion of the text in a document prior to encoding in accordance with some embodiments. The x-axis of the diagram in FIG. 7 indicates the lengths of each inter-character space which is marked by an X. An inter-character space that has a numerically greater value indicates a longer inter-character space further away from the 'O' coordinate. A threshold length is indicated in the diagram where only inter-character spaces above the threshold length are to be encoded with information.

Figure 8:
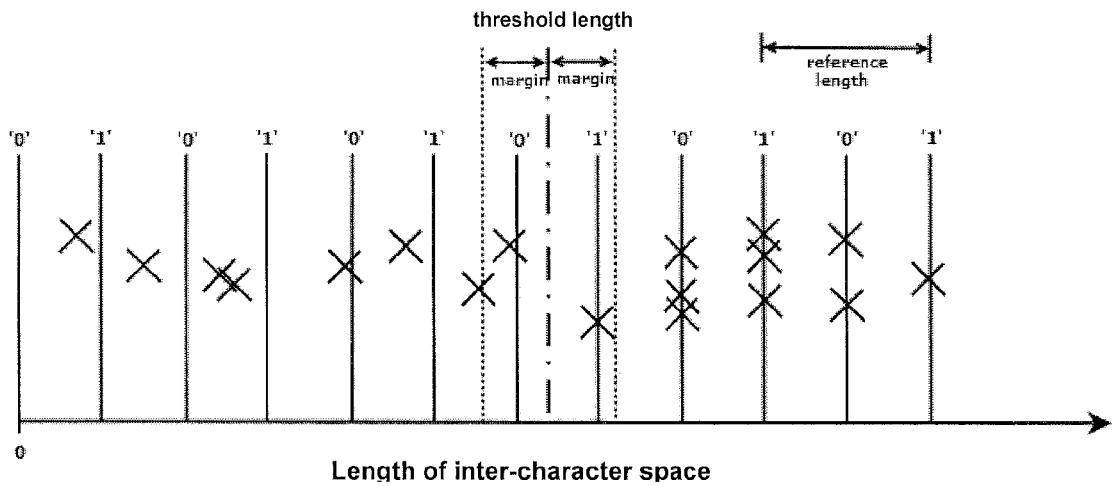
FIG. 8 shows the threshold length and the threshold margin on the length of inter-character spaces of FIG. 7, as well as encoded inter-character spaces in accordance with some embodiments.

FIG. 8 shows the threshold length and the threshold margin on the length of inter-character spaces of FIG. 7, as well as encoded inter-character spaces (i.e. those above the threshold length) in accordance with certain embodiments. FIG. 8 also shows the threshold margin and binary bands '0' and '1' derived from the application of the modulo-based formulas of Equations 1 and 2.

In some examples, once the information has been encoded into the altered inter-character spaces, when the threshold length is 20 units, and the threshold margin is 5 units, the encoding algorithm will identify the inter-character spaces that are between 15 and 25 units and alter those inter-character spaces to be outside the threshold margin. In other words, the threshold margin creates a guard band on either side of the threshold length. The threshold margin can be derived from the reference length or derived independently. When an inter-character space is within the threshold margin, it is increased or decreased to lie outside the margin.

Figure 9:
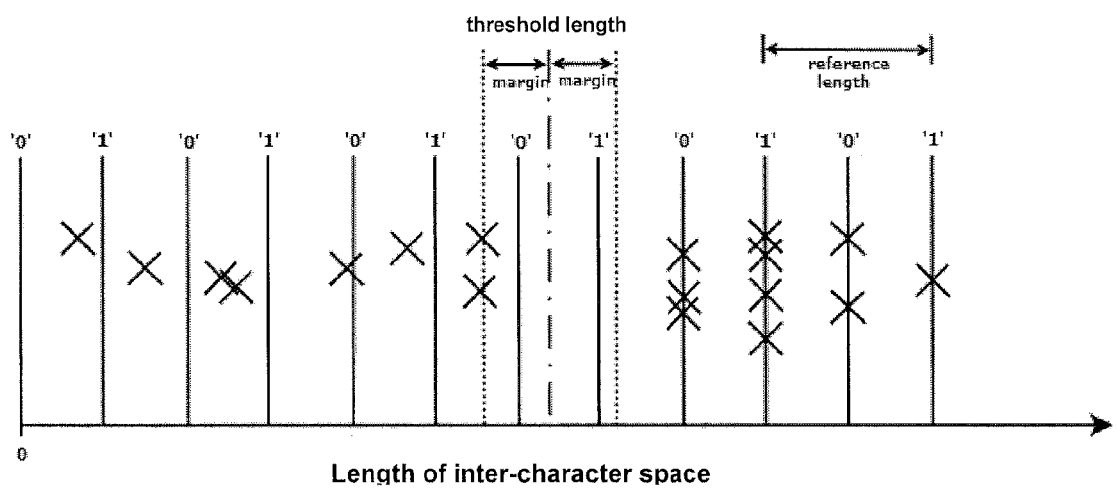
FIG. 9 shows the altered inter-character spaces after the encoding process including the removal of inter-character spaces in the threshold margin in accordance with some embodiments.

Using the same aforesaid example, if the inter-character space had been originally discarded because it was measured to be 19 units (below the threshold length of 20 units), and during the decoding process, the algorithm identifies this length of inter-character space as 21 units, the decoding algorithm would identify this length as encoded and attempt to decode it, leading to an error because this inter-character space was never encoded. As described above, to prevent such errors from occurring, the encoding algorithm will identify and modify inter-character spaces that are within the threshold margin. In the previous case, the inter-character space having a length of 19 units falls within the threshold margin of 15 to 25. The encoding algorithm alters this inter-character space such that the length of 19 units is reduced to lie at the lower end of the threshold margin, i.e. at 15 units. Since 15 units is substantially lower than the threshold length of 20 units, it is highly unlikely that the decoding algorithm will identify the length as being above 20 units, even after accounting for noise and measurement tolerance. FIG. 8 shows some inter-character spaces that lie within the lower threshold margin. Since they are below the threshold length, they are not encoded to lie on a binary band. The encoding algorithm identifies the inter-character spaces within the lower threshold margin and modifies the inter-character spaces such that they are adjusted to be outside the lower threshold margin, as shown in FIG. 9.

In the case where the inter-character space is above the threshold length and thus encoded with information by the encoding algorithm, the encoding algorithm ensures that the altered inter-character space does not lie within the threshold margin. If the altered inter-character space was 21 units, and the decoding algorithm identifies this length as 19 units, then this space is not decoded despite being encoded with information, leading to an error. As described above, to prevent such errors from occurring, the encoding algorithm identifies altered inter-character spaces that are within the threshold margin and increases them to lie at or above the higher end of the threshold margin by altering them to the next similar binary band, which may lie at, for instance, 25 units. Since 25 units is substantially higher than the threshold length of 20 units, it is highly unlikely that the decoding algorithm will identify the length as being below 20 units, even after accounting for noise and measurement tolerance. Using the same aforesaid example, FIG. 8 shows an altered inter-character space that lies within the upper threshold margin on a '1' binary band. The encoding algorithm identifies the altered inter-character space within the upper threshold margin and modifies the altered inter-character space such that it lies outside the upper threshold margin, as shown in FIG. 9. In this case, because the altered inter-character space above the threshold length is encoded, the altered inter-character space must be modified such that its length falls on a similar binary band. As the altered inter-character space was on a '1' binary band, it should be modified to be placed on the next available '1' binary band above the threshold length.

The threshold margin thus provides additional robustness in the face of unanticipated noise that may be encountered during a print-scan cycle and during other document handling.

The lengths of the inter-character spaces can be altered to their new lengths by manipulating the document using a suitable processing system in the case of PostScript or PDF files. If the digital page is an image, space modification may use image processing techniques.

Once the document is encoded with the information, it is intended to be printed and circulated like any other document. The printout may be subjected to scanning and photocopying, or may undergo wear and tear. If at any point during its lifecycle the provenance of this document needs to be established, the information is recovered through decoding, which will be explained in detail below. The embedding of information into printed text documents is only one application of the modulo encoding method as described above. The method can be used to hide data in any numeric sequence in domains such as for example, electronic communications, networking and signal processing.

Since the reference length is small compared to the size of the page and the characters, the embedded information is hidden in such a manner that the naked eye cannot detect the difference between a document containing the information and a document without the information. Additionally, the original document is not required for extracting the information from an encoded document. The encoding capacity is one bit per encoded space, which is higher than comparable methods. In addition, a text document in any visual format, for example, one that is single-spaced, multi-spaced, or multi-columnar, can be encoded with the information. Finally, any copies of the text document, that is, after being subjected to printing, photocopying, linear scaling and/or rotation, remain decodable.

Printing, scanning, and copying may introduce geometric distortions, which may make data extraction difficult. A variety of techniques to reduce these geometric distortions is well-known and they continue to be developed. The described encoding and decoding is not limited to any of these techniques.

The encoding and decoding are applicable to various text documents such as transcripts, diplomas, certificates, and/or the like in the academic field; shares and bonds certificates, insurance policies, statements of account, letters of credit, legal forms, and/or the like in the financial field; immigration visas, titles, financial instruments, contracts, licenses and permits, classified documents, and/or the like in the government field; prescriptions, control chain management, medical forms, vital records, printed patient information, and/or the like in the health care field; schematics, cross-border trade documents, internal memos, business plans, proposals, designs, and/or the like in the business field; tickets, postage stamps, manuals and books, coupons, gift certificates, receipts, and/or the like in the consumer field; and/or many other applications and fields.

Figure 10:
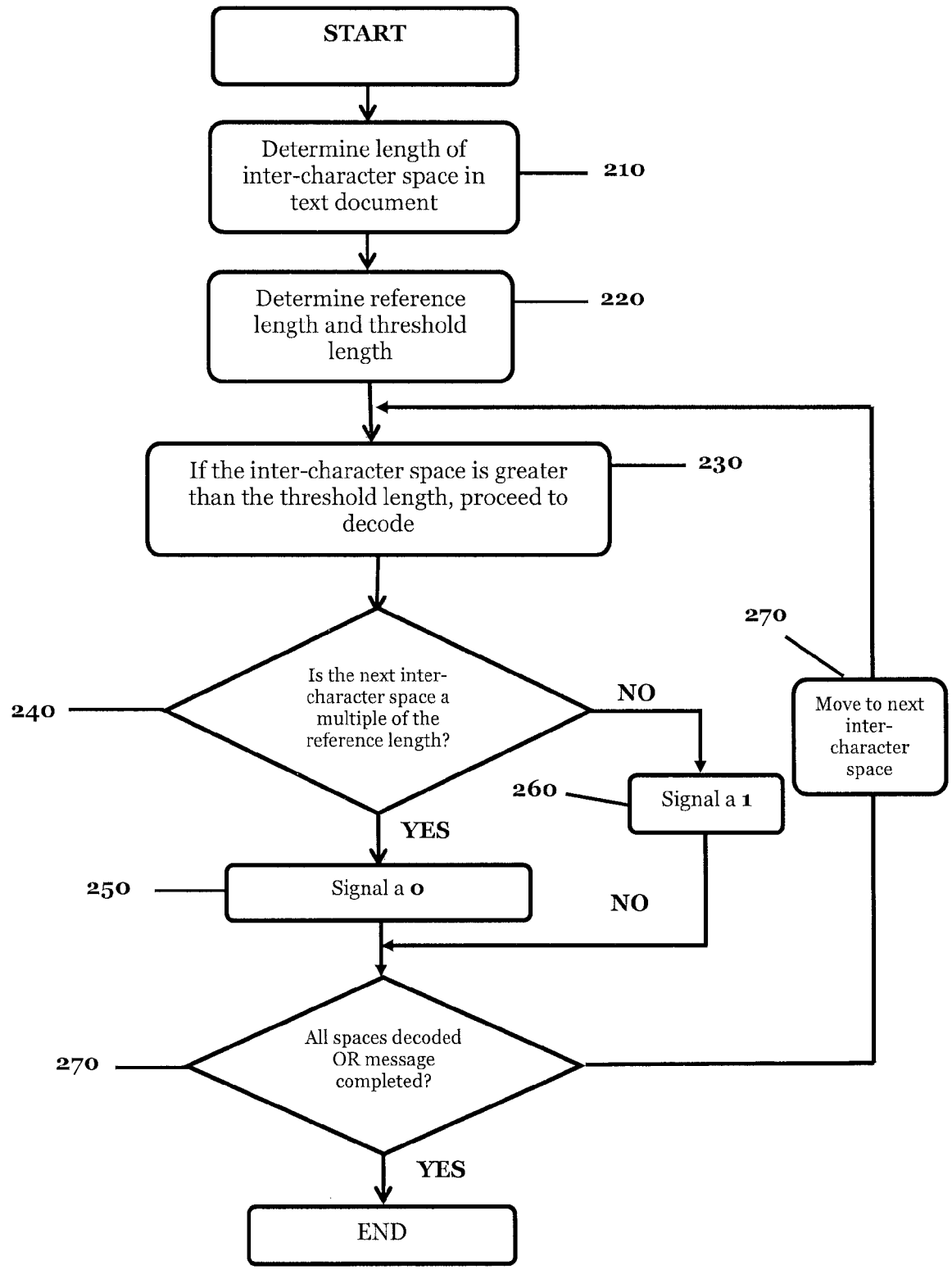
FIG. 10 is a flow chart describing the decoding process in accordance with some embodiments.

FIG. 10 shows a method of decoding information or covert data in a text document in accordance with some embodiments. To decode information in the text document, the length of each inter-character space within the text document needs to be determined at step 210. When the digital page is encoded in a format such as PDF or PostScript, the lengths may be extracted using a parser. When the digital page is an image rather than a document file, the extraction of these lengths may be made using image processing techniques. As the extraction of the lengths of inter-character spacing in a text document uses known techniques which are known to persons skilled in the art, a detailed explanation of the various techniques would not be required.

Once the length of each inter-character space has been determined, a reference length and a threshold length are determined at step 220. The reference length and the threshold length, as determined and mentioned above, can be a function of the dimensions of the text document. For example, the reference length and the threshold length can be the average height or width of the characters in the text document or a function of the dimensions of the text document (that is, of the page of the document itself), or combinations thereof. To decode the encoded text document, both the reference length and the threshold length should be the same as that used for encoding the document. It is noted that the algorithm works on relative values. The lengths can be measured in any unit, as long as the same unit is used throughout the document for both the encoding and the decoding process.

The information includes a sequence of binary numbers consisting of 0 or 1 encoded in the text document, which represents meaningful information to the person encoding the information. Referring to FIG. 10, the decoding process iterates through each inter-character space in the text document and checks whether the inter-character space is greater than the threshold length, as in step 230. When the inter-character space is greater than the threshold length, the decoding process determines whether the length of the inter-character space is an integral multiple of the reference length. When the length of the inter-character space is an integral multiple of the reference length, a 0 binary number is signaled (at step 250), and when the length of the inter-character space is a non-integral multiple of the reference length, a 1 binary number is signaled (at step 260). For example, the non-integral multiple of the reference length can indicate that it is at a midpoint between two integral multiples of the reference length. In the case where reverse encoding was used, a 1 binary number is signaled when the length of the inter-character space is a non-integral multiple of the reference length and a 0 binary number is signaled when the length of the inter-character space is an integral multiple of the reference length. The process is iterative and determines when the complete sequence of binary numbers has been decoded at step 270. When the complete sequence of binary numbers or the complete message has not been decoded, the process returns to step 280 and moves on to the next inter-character space. Once the complete sequence of binary numbers has been decoded, the message is complete and the process ends.

Some embodiments of data encoding device 132 and/or data decoding device 152 may include non-transient, tangible, machine readable media that include executable code that when run by one or more processors (e.g., processor 134 and/or 154) may cause the one or more processors to perform the processes of the methods described in FIGS. 2, 3, and/or 10. Some common forms of machine readable media that may include the processes of the methods described in FIGS. 2, 3, and/or 10 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

While embodiments of the invention have been described and illustrated, it will be understood by those skilled in the technology concerned that many variations or modifications in details of design or construction may be made without departing from the invention.

The invention claimed is:

1. A method of encoding information in text documents, the method comprising:
   obtaining a text document having dimensions and at least a first character and a second character;
   determining a length between the first character and the second character to define an inter-character space;
   determining a reference length, the reference length being a function of the dimensions;
   determining a threshold length, the threshold length being a minimum length wherein information is not encoded in the inter-character space when the inter-character space is less than the threshold length;
   encoding the information into an altered inter-character space wherein a length of the altered inter-character space is an integral multiple of the reference length or a non-integral multiple of the reference length; and
   determining whether the length of the altered inter-character space is within a threshold margin, wherein the threshold margin is a predetermined minimum length on both sides of the threshold length to define a lower threshold margin and an upper threshold margin.

2. The method according to claim 1, further comprising:
   modifying the length of the altered inter-character space such that the length of the modified altered inter-character space lies outside the lower threshold margin or the upper threshold margin.

3. The method according to claim 1, wherein the information includes a sequence of binary numbers, and the length of the inter-character space is altered to the nearest integral multiple of the reference length when a 0 binary number is encoded.

4. The method according to claim 1, wherein the information includes a sequence of binary numbers, and the length of the inter-character space is altered to the non-integral multiple of the reference length when a 1 binary number is encoded, the altered inter-character space being a length halfway between nearest integral multiples of the reference length.

5. The method according to claim 1, wherein the dimensions include a width of the first character and the second character and the reference length is based on the width of the first character and the second character.

6. The method according to claim 1, wherein the dimensions include a height of the first character and the second character and the reference length is based on the height of the first character and the second character.

7. The method according to claim 1, wherein the dimensions include a height and width of the first character and the second character, and the reference length is a predetermined percentage of a sum including the height and width of the first character and the second character.

8. The method according to claim 1, wherein the dimensions include a height of the text document, and the reference length is a predetermined percentage of the height of the text document.

9. The method according to claim 1, wherein the dimensions include a width of the text document, and the reference length is a predetermined percentage of the width of the text document.

10. The method according to claim 1, wherein the dimensions include a height and width of the text document, and the reference length is a predetermined percentage of the sum of the height and the width of the text document.

11. The method according to claim 1 wherein the reference length is smaller than an average length of all inter-character spaces in the text document.

12. The method according to claim 1, further comprising decoding the text document to extract the information by:
    determining a length of inter-character spaces in the text document;
    determining whether the length of each of the inter-character spaces is greater than the threshold length;
    determining whether the length of each of the inter-character spaces is an integral multiple of a second reference length or a non-integral multiple of the second reference length where the length of each of the inter-character spaces is greater than the threshold length;
    extracting the information including a binary sequence, wherein a 0 binary number is extracted when a length of a respective inter-character space is the integral multiple of the second reference length and a 1 binary number is extracted when the length of the respective inter-character space is the non-integral multiple of the second reference length.

13. A system for encoding information in text documents, the system comprising:
    a data encoding processing device that receives a text document having dimensions and at least a first character and a second character, comprising:
    a processor for determining a length between the first character and the second character to define an inter-character space, and determining a reference length and a threshold length, the reference length being a function of the dimensions and the threshold length being a minimum length wherein information is not encoded in the inter-character space when the inter-character space is less than the threshold length;
    wherein the processor encodes information into an altered inter-character space, wherein a length of the altered inter-character space is an integral multiple of the reference length or a non-integral multiple of the reference length; and
    wherein the processor determines whether the length of the altered inter-character space is within a threshold margin, wherein the threshold margin is a predetermined minimum length on both sides of the threshold length to define a lower threshold margin and an upper threshold margin.

14. The system according to claim 13, wherein the processor modifies the length of the altered inter-character space such that the length of the modified altered inter-character space lies outside the lower threshold margin or the upper threshold margin.

15. The system according to claim 13, wherein the information includes a sequence of binary digits, and the length of the inter-character space is altered to the nearest integral multiple of the reference length when a 0 binary number is encoded.

16. The system according to claim 13, wherein the information includes a sequence of binary digits, and the length of the inter-character space is altered to the non-integral multiple of the reference length when a 1 binary number is encoded, the altered inter-character space being a length halfway between nearest integral multiples of the reference length.

17. The system according to claim 13, wherein the dimensions include a width of the first character and the second character and the reference length is based on the width of the first character and the second character.

18. The system according to claim 13, wherein the dimensions include a height of the first character and the second character and the reference length is based on the height of the first character and the second character.

19. The system according to claim 13, wherein the dimensions include a height and width of the first character and the second character, and the reference length is a predetermined percentage of a sum including the height and width of the first character and the second character.

20. The system according to claim 13, wherein the dimensions include a height of the text document, and the reference length is a predetermined percentage of the height of the text document.

21. The system according to claim 13, wherein the dimensions include a width of the text document, and the reference length is a predetermined percentage of the width of the text document.

22. The system according to claim 13, wherein the dimensions include a height and width of the text document, and the reference length is a predetermined percentage of a sum of the height and the width of the text document.

23. The system according to claim 13 wherein the reference length is smaller than an average length of all inter-character spaces in the text document.

* * * * *